No. 792,543. PATENTED JUNE 13, 1905.
J. F. McNEILL.
FERTILIZER OR SEED DISTRIBUTER FOR GRAIN DRILLS.
APPLICATION FILED SEPT. 3, 1904.
2 SHEETS—SHEET 1.
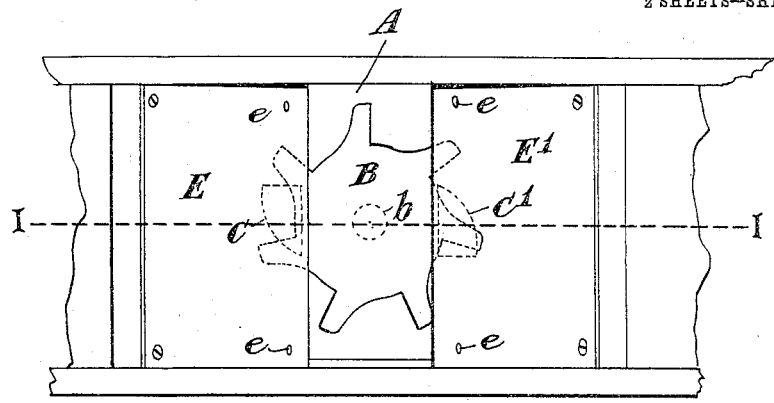
Fig.1.
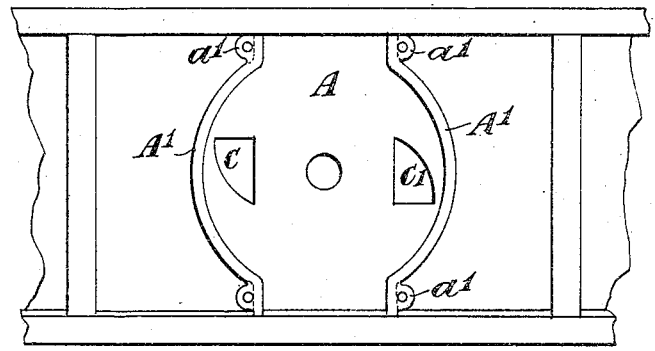
Fig.2.
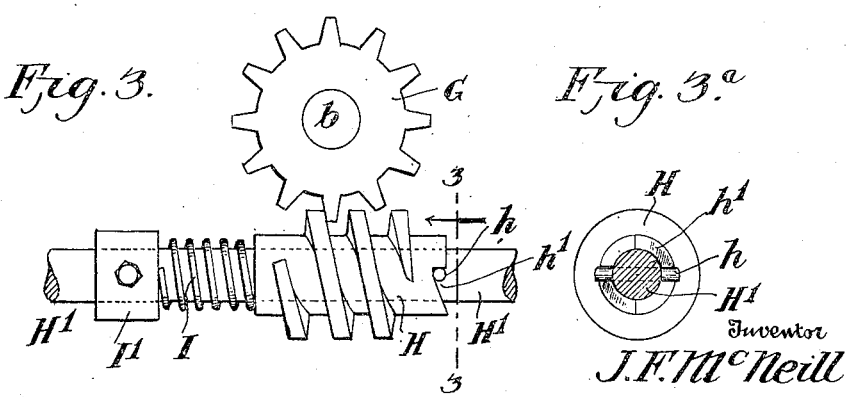
Fig.3. Fig.3ª
Witnesses
Frank W. Hough
C. C. Hines
Inventor
J. F. McNeill
By Victor J. Evans
Attorney No. 792,543. PATENTED JUNE 13, 1905.
J. F. McNEILL.
FERTILIZER OR SEED DISTRIBUTER FOR GRAIN DRILLS.
APPLICATION FILED SEPT. 3, 1904.

2 SHEETS—SHEET 2.

Witnesses
Frank W. Hough
C. C. Hines.

Inventor
J. F. McNeill
By Victor J. Evans
Attorney

No. 792,543. Patented June 13, 1905.

UNITED STATES PATENT OFFICE.

JOHN FRANCIS McNEILL, OF MELBOURNE, VICTORIA, AUSTRALIA.

FERTILIZER OR SEED DISTRIBUTER FOR GRAIN-DRILLS.

SPECIFICATION forming part of Letters Patent No. 792,543, dated June 13, 1905.

Application filed September 3, 1904. Serial No. 223,286.

*To all whom it may concern:*

Be it known that I, JOHN FRANCIS MC-NEILL, a subject of the King of Great Britain and Ireland, &c., residing at the corner of Spenser and Bourke streets, Melbourne, in the State of Victoria and Commonwealth of Australia, have invented certain new and useful Improvements in and Connected with Fertilizer or Seed Distributers for Grain-Drills; and I do hereby declare the following to be a full, clear, and exact description of the invention, such as will enable others skilled in the art to which it appertains to make and use the same.

My invention relates to improvements in distributers for fertilizer, grain, and other drills in which the feeders revolve horizontally on the bottom of the hopper; and the objects of my improvements are, first, to provide novel means for feeding the fertilizer or grain through a plurality of outlets to hoes communicating therewith, thus enabling one feeder to feed two or more hoes and avoiding the necessity of providing a feeder for each hoe, and, second, to provide novel feeder-operating means which is automatically thrown out of gear when any obstruction prevents the same from revolving and automatically thrown into gear when the obstruction is removed.

With these and other objects in view the invention consists of the features of construction, combination, and arrangement of parts hereinafter fully described and claimed, reference being had to the accompanying drawings, in which—

Figure 4:
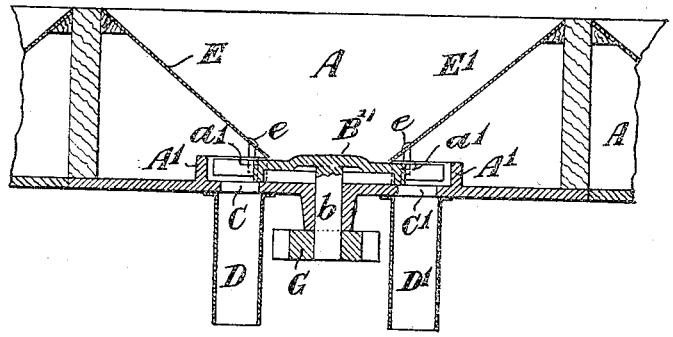
Figure 5:
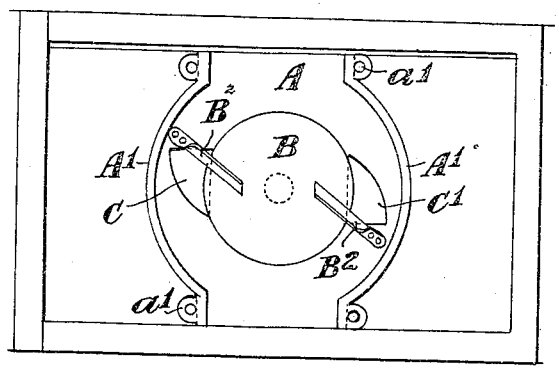
Figure 6:
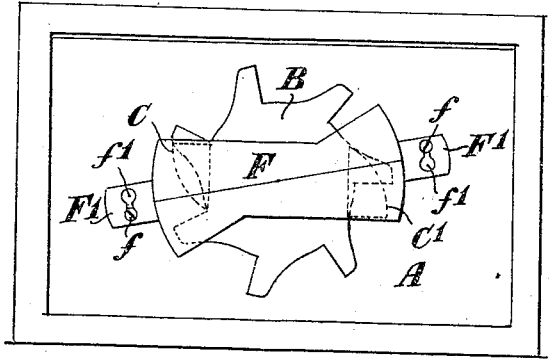

Figure 1 is a top plan view of a hopper and my improved distributing mechanism. Fig. 2 is a view of the hopper as it appears when the revolving feeder is removed. Fig. 3 is a detail view of the driving mechanism for the feeder. Fig. 3ª is a section on line 3 3 of Fig. 3. Fig. 4 is a vertical section on line 1 1 of Fig. 1. Fig. 5 is a plan view of the invention as applied to a plain circular disk feeder, and Fig. 6 is a plan view showing a modified form of covering and guide for the revolving feeder.

Similar letters refer to similar parts throughout the several views.

The material to be distributed is placed into a hopper A, the bottom of which may be of metal and provided with segmental flanges A', which form a recess or seat for the revolving feeder B, which is preferably of the "Star" pattern, as shown. The feeder B conveys the fertilizer to a plurality of discharge openings or outlets C C', formed in the bottom of hopper A, from which the fertilizer is discharged to spouts D D', attached to the under side of hopper A, each conveying the material to its respective hoe or drill. By thus arranging the revolving feeder B to feed two or more hoes or drills the necessity of providing a feeder for each hoe or drill is avoided and a considerable saving in the cost of manufacture of the machine effected, as will be readily understood.

Hopper A is provided with detachable inclined plates E E', which lead the fertilizer in such a manner over the feeder B that a uniform distribution through both discharge-outlets C C' is insured. These inclined feed-plates E E' are secured to the sides of hopper A by screws or by other suitable means, while their bottom ends are provided with projecting pins $e$, which are designed to drop into lugs $a'$, formed on flanges A', and by this means the plates are kept firmly in position and may be readily applied and removed.

In Fig. 5 is shown a feeder or distributer B' which is a plain circular plate or disk. This plate B' as it revolves carries the fertilizer to be distributed until the same is forced off the plate into discharge-openings C C' by means of spring-metal scrapers $B^2$, a simple form of which may be a piece of spring-steel set at an angle, as shown.

Referring to Fig. 6, F is a detachable hood or cover guide for the feeder B, provided with an inclined top and secured to the bottom of hopper A by pins $f$, working in slots $f'$, formed in projecting lugs F'. Said hood F may take the place, if desired, of the inclined feed-plates E E', previously referred to, and may be used in conjunction with flanges A'.

The driving mechanism for the distributing apparatus consists of a small toothed wheel G, attached to the spindle $b$ of the feeder B and operated by a loose worm H, mounted on the shaft H' and capable of longitudinal motion thereon. Said shaft H', which is carried in suitable bearings, (not shown,) is provided with a pin $h$, passing through it, which contacts with clutch-teeth $h'$, formed on the extreme end of worm H. The pin $h$ is kept in contact with the teeth $h'$ by means of a coiled spring I, one end of which bears against the worm H and the other against an adjustable collar I', secured to the shaft H' by a set-screw or by other suitable means. The result of this arrangement is that when the shaft H' revolves the pin $h$ contacts with the teeth $h'$ of worm H, thus revolving same, which in turn operates toothed wheel G and feeder B. Should the feeder B, however, get choked or prevented from rotating, the worm H, still revolving, travels longitudinally on the shaft H', thus releasing the teeth $h'$ from the pin $h$. When the obstruction is removed from the feeder B, the spring I forces the worm forward into gear again on the next revolution of the shaft.

Having thus described the invention, what is claimed as new is—

1. In a grain or fertilizer distributer, the combination of a hopper having a bottom provided with feed-outlets, flanges rising from said bottom and forming a feed-chamber, a rotary feeder in said feed-chamber, lugs carried by the flanges, and inclined conductors mounted in the hopper and having pins detachably engaging said lugs, substantially as described.

2. In a grain or fertilizer distributer, a hopper having a plurality of outlets, inclined conductors extending over said outlets, and a rotary feeder having feeding elements arranged beneath the conductors and adapted to feed the grain or fertilizer to said outlets.

3. In a grain or fertilizer distributer, the combination of a hopper having feed-outlets, guard plates or flanges adjacent to the outlets, a feeder arranged to rotate between said flanges, and inclined conductor-plates leading downwardly from the ends of the hopper and over said feed-outlets and adjacent portions of the feeder, substantially as described.

4. In a grain or fertilizer distributer, the combination of a drive-shaft, a rotary feeder, gearing for driving the feeder from said shaft, and a clutch device coacting with said gearing and adapted to disconnect the gearing from said shaft when the feeder is obstructed and to automatically connect the gearing with the shaft when the obstruction is overcome or removed, substantially as described.

5. In a grain or fertilizer distributer, a drive-shaft having a fixed clutch element, a coacting clutch element slidably mounted on the shaft, a feeder, intermeshing gears for imparting motion to the feeder from the sliding clutch element, and a spring acting on the sliding clutch element to urge the same into engagement with said fixed clutch element, substantially as described.

In testimony whereof I affix my signature in presence of two witnesses.

JOHN FRANCIS McNEILL.

Witnesses:
  C. Harkett,
  Daniel McNeill.